US008061607B1

(12) United States Patent
Crossno et al.

(10) Patent No.: US 8,061,607 B1
(45) Date of Patent: *Nov. 22, 2011

(54) METHOD AND SYSTEM OF UNIVERSAL RFID COMMUNICATION

(75) Inventors: Adam Crossno, Flower Mound, TX (US); Dennis Shawn Key, Arlington, TX (US); Viswanath Puttagunta, Richardson, TX (US); Ravi Kumar Viswaraju, Richardson, TX (US)

(73) Assignee: OnAsset Intelligence, Inc., Irving, TX (US)

( * ) Notice: Subject to any disclaimer, the term of this patent is extended or adjusted under 35 U.S.C. 154(b) by 348 days.

This patent is subject to a terminal disclaimer.

(21) Appl. No.: 12/331,822

(22) Filed: Jan. 8, 2009

Related U.S. Application Data

(63) Continuation of application No. 11/064,869, filed on Feb. 24, 2005, now Pat. No. 7,475,806.

(51) Int. Cl.
*G06K 7/00* (2006.01)
*G06K 7/08* (2006.01)
*G06K 19/00* (2006.01)
*H04Q 5/22* (2006.01)
*G08B 13/14* (2006.01)

(52) U.S. Cl. ........ 235/439; 235/375; 235/435; 235/449; 235/451; 235/487; 340/572.1; 340/10.1

(58) Field of Classification Search ................ 235/487, 235/375, 435, 449, 451; 340/572.1, 10.1
See application file for complete search history.

(56) References Cited

U.S. PATENT DOCUMENTS

| | | | | |
|---|---|---|---|---|
| 5,485,590 | A * | 1/1996 | Hyatt et al. .................... 711/115 |
| 5,559,501 | A * | 9/1996 | Barzegar et al. ............... 361/728 |
| 5,747,786 | A * | 5/1998 | Cargin et al. ............ 235/462.46 |
| 6,785,556 | B2 * | 8/2004 | Souissi .......................... 455/557 |
| 7,162,395 | B1 * | 1/2007 | Holmes et al. ................. 702/188 |
| RE40,538 | E * | 10/2008 | Sarfati .......................... 235/380 |
| 7,475,806 | B1 * | 1/2009 | Crossno et al. ............... 235/375 |
| 2001/0010032 | A1 * | 7/2001 | Ehlers et al. ..................... 702/62 |
| 2001/0016905 | A1 * | 8/2001 | Kasamatsu et al. ........... 713/100 |
| 2001/0048361 | A1 * | 12/2001 | Mays et al. ................. 340/10.51 |
| 2002/0002655 | A1 * | 1/2002 | Hoskins ........................ 711/112 |
| 2002/0055278 | A1 * | 5/2002 | Lee et al. ........................ 439/49 |
| 2002/0068608 | A1 * | 6/2002 | Souissi .......................... 455/557 |
| 2002/0159601 | A1 * | 10/2002 | Bushmitch et al. ........... 380/277 |
| 2004/0128420 | A1 * | 7/2004 | Su et al. ......................... 710/302 |

(Continued)

*Primary Examiner* — Daniel Walsh
(74) *Attorney, Agent, or Firm* — Bruce C. Lutz; Jack D. Stone, Jr.

(57) ABSTRACT

A method and an apparatus are provided for a universally operable Radio Frequency Identification (RFID) tag reader base unit. An RFID base unit is provided that can communicate with at least two different types of RFID tags, one at a time, that are commercially available as well as communicate with data collecting entities using any of at least two communication standards. The reader comprises a microprocessor (microcontroller) portion having at least one set of plug-in connectors. The reader then operates in different operational logic processes in accordance with the types and parameters of attached plug-in modules. The plug-in modules will typically comprise RF frequency modules for communicating with the RFID tags as well as a communication standard model for communicating with a computer network. Additionally, the plug-in modules contain memory that contains data and code used by the microprocessor in performing the operations obtainable by specific types of plug-in modules. If upgrading of the operating system is required, such upgrading can be accomplished through the use of an associated port such as a microcontroller interface port, a memory stick slot or using a computer in conjunction with a communication module.

8 Claims, 3 Drawing Sheets

U.S. PATENT DOCUMENTS

| | | | |
|---|---|---|---|
| 2004/0164148 A1* | 8/2004 | Qiu | 235/383 |
| 2005/0110612 A1* | 5/2005 | Carrender | 340/10.1 |
| 2005/0188381 A1* | 8/2005 | Mitekura et al. | 719/321 |
| 2006/0145850 A1* | 7/2006 | Krstulich | 340/572.1 |
| 2006/0267762 A1* | 11/2006 | Jedlicka et al. | 340/539.23 |
| 2007/0044095 A1* | 2/2007 | Banerjee | 717/176 |
| 2008/0068173 A1* | 3/2008 | Alexis et al. | 340/572.7 |
| 2010/0109840 A1* | 5/2010 | Schilling | 340/10.1 |

* cited by examiner

METHOD AND SYSTEM OF UNIVERSAL RFID COMMUNICATION

CROSS-REFERENCE TO RELATED APPLICATIONS

This application is a continuation of prior application Ser. No. 11/064,869, filed Feb. 24, 2005.

The entire contents of U.S. Pat. No. 7,233,247, entitled: "METHOD AND SYSTEM FOR EMPLOYING RFID TAGS IN AUTOMATED APPLICATIONS" issued on 19 Jun. 2007, are incorporated herein by reference for all purposes.

FIELD OF THE INVENTION

The present invention relates generally to Radio Frequency Identification (RFID) and, more particularly, to an RFID base unit reader that may be easily, quickly and economically converted to read tags of different types and/or using different protocols and provide outgoing data in various communication standard formats.

DESCRIPTION OF THE RELATED ART

RFID tags and tag reader devices have been around since World War II. The first known usage of RFID tags was by the United Kingdom's Royal Air Force. The RAF placed RFID tags in their aircraft, so that the Spitfires and other allied aircraft could be distinguished from German aircraft.

Over the years, though, RFID tags have become more ubiquitous. RFID tags are commercially available in a wide variety of applications ranging from implanted tags for keeping track of pets to toll tags. Categorically, there are three types of RFID tags commercially available: passive, semi-passive, and active. Passive tags are unpowered RFID tags that utilize radiation or electromagnetic fields in order to function. Active tags have their own power source, and semi-active tags utilize both an internal power supply and absorbed radiation or electromagnetic fields.

A passive RFID tag is, by definition, unpowered. Radiation is received by a tag antenna from a base unit reader antenna and transmitted to tag RF circuits. The tag RF circuits can then de-modulate or processes the signals received by the tag antenna. The processed signals are then communicated to a tag ID circuit. The tag ID circuit generates an ID number or some other identification signal. Once the tag ID circuit generates an identifying signal, the tag RF circuit and the tag antenna can then transmit the identifying signal back to the reader unit.

Therefore, by receiving an electromagnetic signal, processing it, and retransmitting it, the passive RFID tag essentially reflects the received radiation. So, by varying the tag ID circuitry and/or the tag RF circuitry, each tag can reflect radiation differently causing each tag to be uniquely distinguishable.

There are a wide variety of applications for RFID tags similar to the passive RFID tag described above.

Typically, an active RFID tag comprises a tag antenna, tag Radio Frequency (RF) Circuits, a tag Identification (ID) circuit, and a tag battery.

The active RFID tag is, by definition, powered. Under the circumstance of having a powered RFID tag, there are a larger number of operations that can be performed by the active RFID tag. Signals can be received and transmitted by the tag antenna, which provides the signals to the tag RF circuits. The tag RF circuits can then modulate and de-modulate signals.

Because the active RFID tag is powered by a battery, the tag ID circuits can be operating constantly. The tag ID circuit can both send signals to and receive signals from the tag RF circuits. The tag ID circuit can generate identifying signals or be in active communication with an RFID reader station or unit. Hence, information contained on the RFID tag can be updated or changed.

There are also a wide variety of applications for active RFID tags similar to that described above.

There are also RFID tags that are referred to in the art as semi-passive tags. It should be noted that the RFID tags generally operate in one of several authorized frequency bands. One band for standard low frequency RFID tags is between 125 kHz to 134 kHz. A band for standard high frequency RFID tags is 13.56 Mhz, while standard Ultra High Frequency (UHF) RFID tags operate in the range of 868 Mhz to 956 MHz and standard microwave RFID tags operate at 2.45 GHz.

It is believed that since the operation of various types of tags is well known, further discussions of their modes of operation are unnecessary.

While the base units may be operated as stand alone devices to perform a function such as setting off an alarm when an anti-shoplifting tag passes out a store entrance, many RFID reader base units are connected to a central computer for the collection of data. The central computer may be designed to receive this data over a given type of communication system. Communication systems presently used include hard-wired standards such as Coaxial Cable, Fiber Optic cable, Firewire and so forth. The systems may also use wireless systems such as Bluetooth, Wi-Fi, Zigbee and so forth.

Thus, each different type of system will require a different configuration of RFID base unit reader. Such differences include different frequencies, types of tags as well as different methods of communication of the data read to the entity utilizing the data (whether that entity is a human being, a central computer or other). It should be noted that conventional RFID readers designed to operate with central computers are dumb terminals in that the readers read tags and send data only upon request from the central computer. Thus the central computer may quickly be inundated with the number of requests and responses required in the process when operating with a large number of readers.

In other words, traditionally, RFID base units were tailored for specific types of tags and applications and the base units have been relatively "dumb" terminals, even when used in a standalone environment.

Systems have been designed where the centralized computer can request, receive and convert data obtained from various types of RFID base unit readers using different types of reader-to-computer communication standards. However, such systems have been expensive to set up and operate.

With the ever increasing utility of RFID tags, it would be desirable to have an RFID base unit that can be easily modified to operate with any type of tag, at any tag frequency and use any given communication standard to communicate with an end user or entity such as a centralized computer. It would further be desirable that the RFID reader be intelligent enough to read each tag detected, convert it to a form that a central computer prefers and transmit same without having to wait for individual requests. It would also be desirable to be able to upgrade single tag type readers operating in a given communication environment to operate with multiple tag types as well as multiple communication standards substantially simultaneously.

SUMMARY OF THE INVENTION

The present invention provides a method and a system for providing a multiuse RFID base unit. An RFID base unit comprising a microcontroller is adapted to interconnect, via plug-in module connectors, with at least one frequency generator interface unit including an antenna for communication with the various frequency and types of tags. The base unit is further adapted to interconnect, via one or more other plug-in modules, to at least one communication standard interface unit.

In another aspect, various other additional connector-compatible modules, such as industrial modules, can be quickly and easily added. In such an arrangement, the microcontroller may provide industrial control functions, such as, for example, operating a relay relative to a given set or combination of "read" operations.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combinations thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
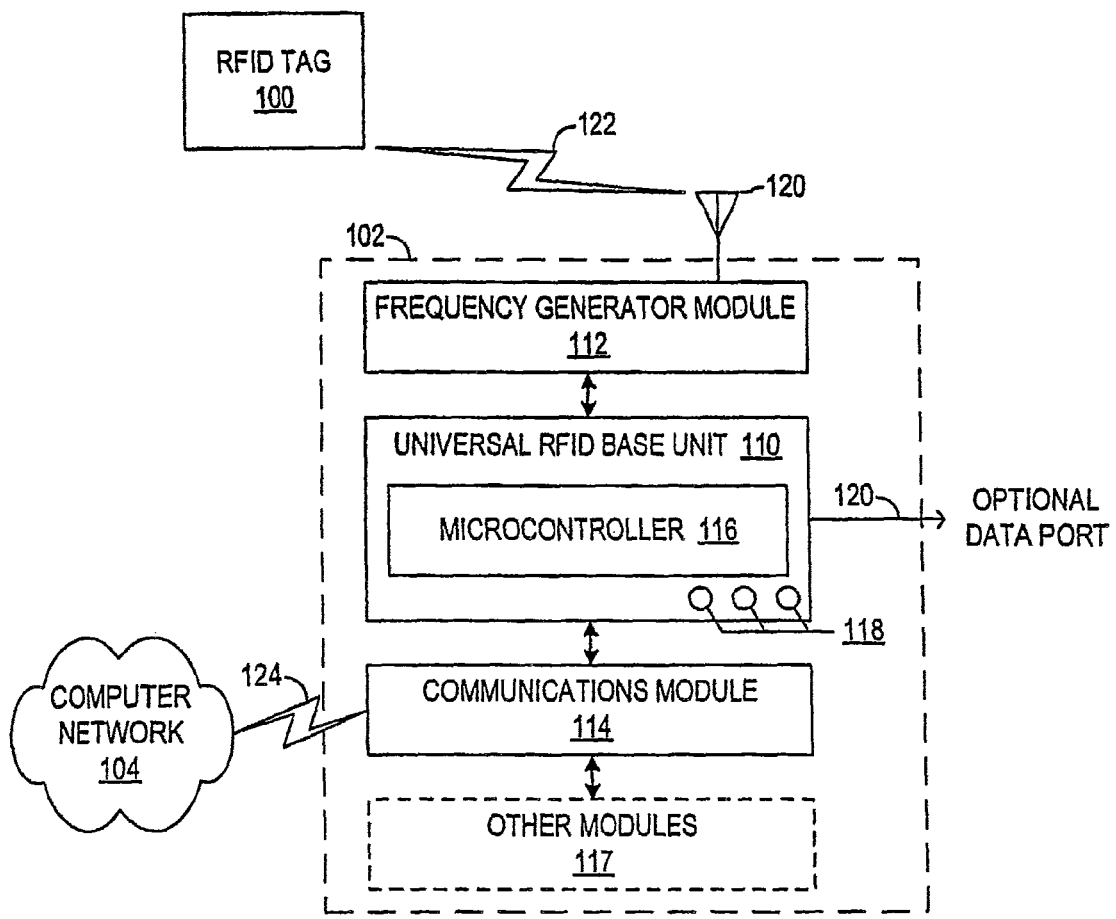
FIG. 1 is a block diagram depicting the manner in which the various components interact with each other, RFID tags and an entity utilizing the data.

Referring to FIG. 1 of the drawings, the reference numeral 100 designates an RFID tag. A dash line block 102 encloses a plurality of components that in total comprise an RFID base unit reader 102. A computer network 104 represents a data sink entity which may utilize or otherwise coordinate the data read from reader 102 with other readers not shown. As will be explained later, the RFID unit 102 may be a stand-alone device that sends data to a memory card inserted into the reader and thus does not need to be connected to the network 104 as shown.

Within block 102 there is illustrated a universal RFID base unit 110, a plug-in frequency generation module 112 and a plug-in communication module 114. Both modules 112 and 114 are in communication with a microcontroller block 116 within unit 110. An optional dash line block 117 is labeled "OTHER MODULES" and may comprise additional communication modules or may be modules used to provide functions in an industrial or commercial environment. As will be described in more detail later, the microcontroller 116, in a preferred embodiment, operates in accordance with data and code retrieved from a memory device of each module plugged into and in communication with the base unit 110. A plurality of circles 118 are intended to represent indicia for informing a user whether or not modules are properly attached and in operable condition. These indicia may also be used for other functions such as indicating that a central computer is not responding to data sent thereto, an optional memory card is full of data, and so forth. While the indicia are shown as indicator lights in a preferred embodiment, the indicia could well comprise an alpha-numeric display for more precise information where the economics warrant such additional information.

An optional micro-controller interface port or other data port 120 is shown on one side of block 110 as a means for updating or replacing the operating system and/or associated reader software when this logic is contained within and is a part of base unit block 110. This port 120, as an example, may comprise a USB port and/or a slot for a memory chip. In other words, the port can not only be used for data storage, but can be used to provide communication to the microcontroller such as for upgrading software. As will be explained later, the microcontroller software, as well as any data and routines in the modules, can be updated via a communication module plugged into the base unit 110 and in communication with a central computer.

An antenna 120 is shown for communicating with tag 100 over a communication path 122. As will be realized, the configuration of the antenna may change as a function of the type of tag being detected.

A communication path 124 provides communication between the network 104 and the communication module 114 of the RFID reader 102. This communication path 124 may comprise any various standard or non-standard formats and may be hard wired or wireless. Examples of the communication paths that are presently used in the industry and may be used in RFID systems include BlueTooth, RS232, Universal Serial Bus (USB), Ethernet, Wireless, T-carrier connections, Firewire® (Apple Computer, Inc., 1 Infinite Loop, Cupertino, Calif. 95014), Optical fiber, Zigbee® (Philips Electronics North American Corp., Avenue of the Americas New York, N.Y. 100201-104), and so forth.

Figure 3:
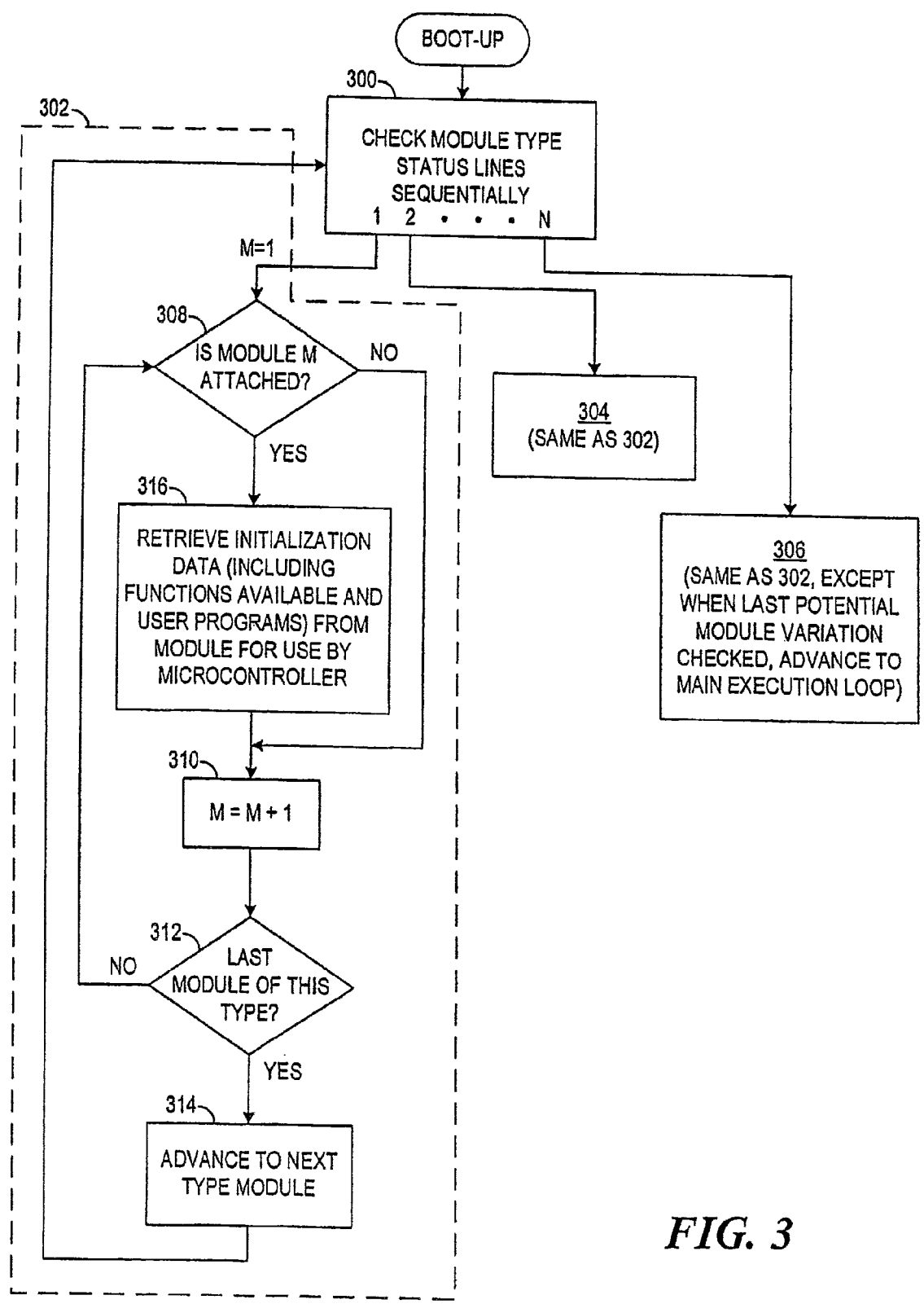
FIG. 3 is a block diagram depicting the process that the microcontroller completes in ascertaining how many and what types of plug-in modules are attached and in retrieving data from the stored memory of those plug-in modules.
Figure 4:
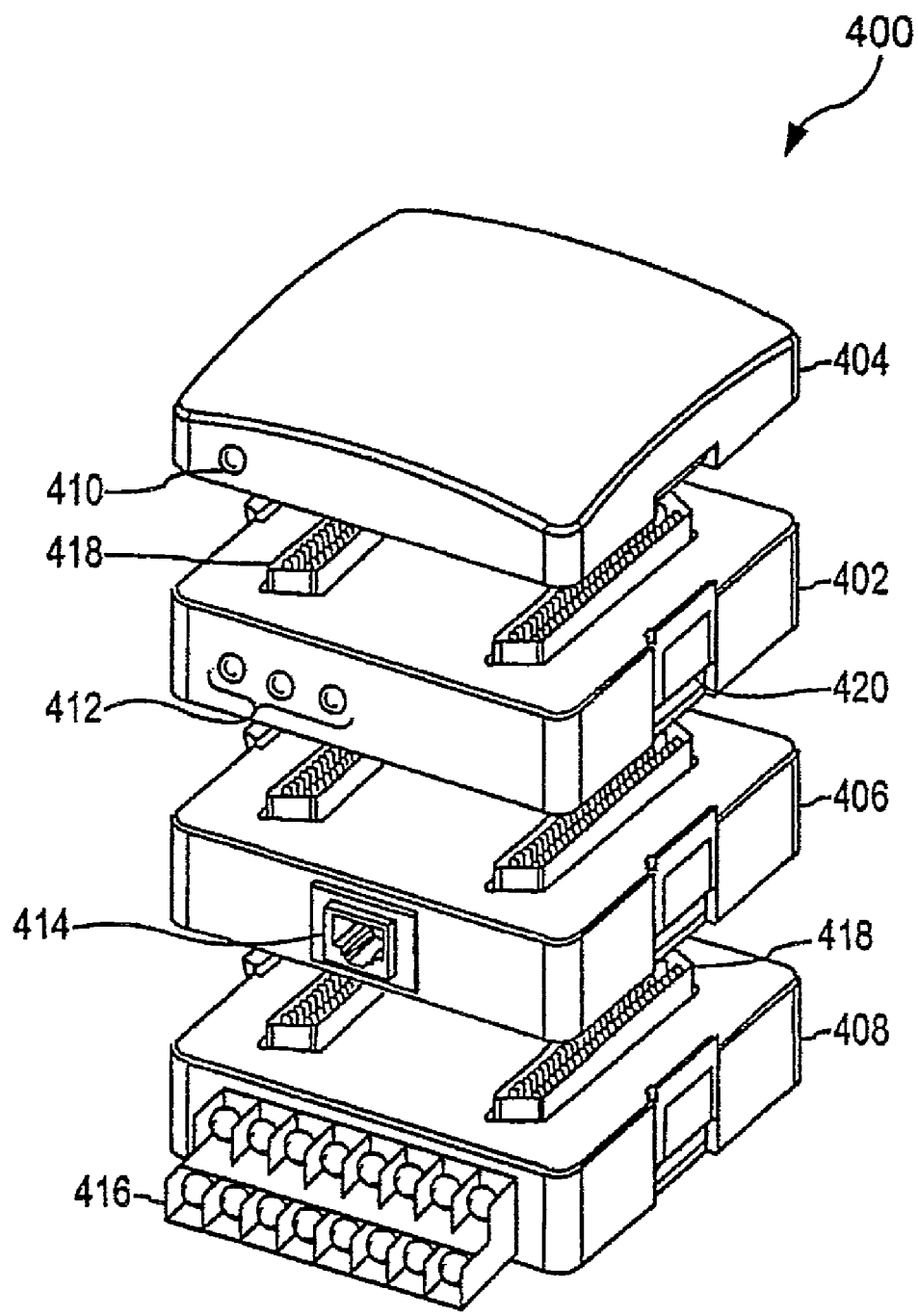
FIG. 4 is an exploded view of one configuration of an RFID reader.

In a preferred mode of operation, each type of attached plug-in module communicates, to the microcontroller 116, that it is an RF unit, communication unit and so forth via a unique pin of the cascaded connector set used in the "piggyback" interconnection arrangement as shown in more detail in FIG. 4. The microcontroller 116, when checking the logic level of these unique pins, can then ascertain that one or more modules of that type are available for use. This process is set forth in more detail in the flow diagram of FIG. 3.

Figure 2:
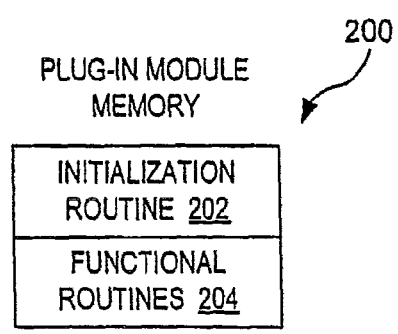
FIG. 2 is a block diagram depicting a plug-in module memory chip and various types of data contained.

In one embodiment, each plug-in module contains a predetermined amount of memory. Referring now to FIG. 2, it may be noted that this memory will typically contain an initialization routine and data relative available functional routines that may be needed for use by the microcontroller in properly operating that module. This is shown in FIG. 2 where a designator 200 represents a memory chip of a given plug-in module, 202 comprises an initialization routine portion of 200 and a portion 204 contains one or more functional routines used to perform some function appropriate to the module containing the chip. It will thus be apparent that the address(es) of these functional routines are transferred to memory in the base unit for use by the microcontroller when the microcontroller needs to access those routines located in the plug-in module.

While any memory could be used, the embodiment shown employs flash memory such that the functionality of a module can be upgraded in accordance with future improvements. Such upgrading may be performed from the previously mentioned port 120 on the module 110 or alternatively from the central computer via the communication module 114.

The micro-controller 116 has the addressing capability, through the cascaded connectors of the attached modules, to address any given portion of the memory of any attached plug-in module. The coding used by the memory of the microcontroller 116 informs the microcontroller how many modules of a given type can be plugged into the base reader. This coding further informs the microcontroller where the initialization routine of a given module would be located in the total memory allotment of the reader device. In the embodiment shown, the total memory for the reader is preferably established at 16 MBytes (MB) with 4 MB allotted for the microcontroller 116 and 4 MB for each type of module.

When the microcontroller 116 is in a start-up mode, it checks the address of the initialization routine for each possible type and variety of module that could be attached. If there is no response, the microcontroller 116 "knows" that there is no module of that type and variety attached. Thus, in view of the above established allotment, if there are two possible varieties of a given type of module that can be connected simultaneously, such as the communication module, then each module would contain 2 MB of memory. Therefore, in the case of checking communication modules, the microcontroller 116 would check the beginning of each of the 2 MB memory address ranges. If there are 4 possible varieties of a module, such as an industrial module, then each module would have only 1 MB of memory and the microcontroller 116 would need to make 4 separate checks to make sure that all appropriate data has been retrieved.

The microcontroller 116 may use the logic level of the module type pins, as mentioned in connection with the description of operation for FIG. 1, to bypass the checking of some type of modules in the sequential checking of 1 through N. However, as will be realized, such pin logic level checking may be forgone, with the microcontroller 116 relying completely on a check of all possible initialization routine locations. A finding of no data returned in response to a request by the microcontroller 116, at a given initialization routine location, provides a clear indication to the microcontroller 116 that no such module, of that variety, is attached.

Referring now to FIG. 3, after "boot-up", the microcontroller 116, as set forth in block 300, checks each type of module status line sequentially from the 1st to the nth line. The sequence of the checking process for the first or type 1 module is set forth in a dash line block 302. These same steps are repeated for the 2nd type module in a block 304. The process remains the same until the nth type module. The only alteration in connection with the nth type module is that, as set forth in block 306, the process advances to the main execution loop of the microcontroller 116 when the last potential module of the nth type has been checked and data retrieved if such module type is found.

Within the process step portion 302, a variable M is set to 1 upon the commencement of checking for the first type of module. A check is made, in a block 308, to see if such a variety of this type of module is attached. This is accomplished by checking the address of the beginning portion of the memory chip for that module as set forth in connection with FIG. 2. If there is no response (no returned data) there is no such variety of that type module attached. Thus the process increments the variable M in a block 310 and then checks to see if this is the final variety of this type of module in block 312. If it is not the last variety to be checked, the next module of that type is addressed in block 308. On the other hand, if this is the final module variety of this type, the block 314 will cause the process to check the next type in block 300. Returning now to block 308, if it is determined that there is data in the initialization portion of that memory block addressed, the data is retrieved as set forth in a block 316 for use by the microcontroller 116 in performing the RFID reader function.

The process of checking the $2^{nd}$ type of module in block 304 is the same as in block 302 and continues in the same fashion until the final type N is checked in block 306. Although the reader could not communicate to a central computer, the microcontroller 116 would be configured to not execute the processes of block 304, if the logic level of the pin associated with this type module indicated no such communication module has been plugged into the connector cascaded reader assembly unit.

It should be noted that the microcontroller 116 can be programmed or otherwise instructed to not only send data to a central computer data collection device, but to additionally send data to a memory stick or other backup data storage through the use of the data port 120.

Reference will now be made to FIG. 4. The entire assembly is referenced as 400 and is essentially the same as block 102 of FIG. 1. Within assembly 400 is a base unit block 402 including a microcontroller (not shown). Plugged into the top of block 402 is an RF generator block 404. Into the bottom of block 402, a communication module 406 and an industrial module 408 can be attached. As illustrated, an indicia 410 of RF module 404 provides an indication that the reader has power and is in an ON condition. A set of indicia 412 on the base unit 402 provides an indication of present operability of the reader 400. A communication port 414 is shown in the form of an Ethernet connector. A set of pins 416 allows interfacing of the illustrated industrial module to some type of industrial control. A pair of connectors 418, on each of the modules, mate with corresponding connectors on the modules above and below a given module with the exception of the uppermost RF module 404 which has connectors only on the bottom. Finally, the tabs 420, shown on the side of each of the modules, comprise spring-load clips used to secure the attachment of interconnected modules. Not shown is microcontroller interface port, corresponding to port 120 in FIG. 1, that is on the back side of base unit 402.

Although the preferred embodiment has the memory of a module comprising an initialization routine and a set of functional routines as shown in FIG. 2, the module memory may be implemented with the addition of user programs which are incorporated into the microcontroller program if so desired. Further, the module memory may contain only an identification of the module in the initialization routine whereby the microcontroller can quickly determine the extent of all attached modules upon startup and use functional routines stored in microcontroller memory to perform any functions associated with all of the attached modules.

In summary, the present invention provides great versatility of reading many types of RFID tags in conjunction with providing collected data to a data sink over many different types of communication links in an economical manner by the use of plug-in modules. Additionally the tag reader is made intelligent through the use of memory chips in each of the modules. The memory chips can reconfigure the microcontroller's mode of operation when different modules are attached to the base unit. Further, since the reader is standalone capable and is an intelligent terminal, the unit can read tags and send data to a central computer upon detection of a tag without first receiving an instruction to do so from the central computer. With the use of an optional memory stick and supplied appropriate programming code, the reader can retrieve and store detected tag data while a central computer or other entity is busy or otherwise unavailable. The reader can then transmit the tag data to the central computer or entity when it is again able to receive data.

While the embodiment is discussed as having 4 MB of memory for the microcontroller and 4 MB of memory for each type of module, the memory of any portion of the RFID base unit can be altered and remain within the scope of the present invention.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. Signal detection apparatus comprising:
microcontroller and associated memory comprising a part of a base unit portion of a multi-use signal detector wherein the base unit of said detection apparatus is adapted for use with at least one of a plurality of different types of plug-in modules; and at least one plug-in module interfacing with the microcontroller of said base unit, said plug-in module comprising circuitry for assisting a given signal detection task and memory including function routines accessible by and used by said microcontroller in completing a given signal detection task; and
said microcontroller, during an initialization routine initiated upon interfacing a plug-in module with a base unit, performs at least one of (a) storing stores the address of functional routines contained in the memory portion of said given plug-in module and (b) downloading at least one of any functional routines contained in the memory portion of said given module.

2. Signal detection apparatus comprising:
microcontroller and associated memory comprising a part of a base unit portion of a multi-use signal detector wherein the base unit of said detection apparatus is adapted for use with at least one of a plurality of different types of plug-in modules;
at least one plug-in module interfacing with the microcontroller of said base unit, said plug-in module comprising circuitry for assisting a given signal detection task and memory including an initialization routine accessible by and used by said microcontroller in ascertaining what types of modules are presently available for use by said microcontroller; and
said microcontroller, during an initialization routine initiated upon interfacing a plug-in module with a base unit, stores the address of functional routines contained in the memory portion of said given module.

3. A microcontroller base unit for determining the types and functionality of memory containing plug-in modules operationally attached to said microcontroller base unit, comprising:
circuitry operable to check the logic signal obtained from a set of plug-in module connector pins wherein said logic signal is uniquely representative of each potential type of plug-in module to determine which types of plug-in modules have been attached;
circuitry operable to access the memory of each type of plug-in module and to retrieve data from the module memory of each plug-in module wherein the retrieved data is used by said microcontroller in determining the manner in which data is obtained and processed by each of said plug-in modules;
circuitry operable to activate at least one functional routine in a plug-in module via the calling of a stored address obtained during the retrieval of data from the module memory; and
circuitry operable to retrieve data from said plug-in modules and to transmit same to a data sink for use by an end user.

4. A method used by a microcontroller for determining the types and functionality of memory containing plug-in modules attached to a microcontroller base unit, comprising:
checking the logic signal obtained from a set of connector pins representing each potential type of plug-in module to determine which types of plug-in modules have been attached;
sequentially accessing the memory of each type of plug-in modules and retrieving data from the module memory of each plug-in module wherein the retrieved data is used by said microcontroller in determining the manner in which data is obtained and processed;
activating at least one functional routine in a plug-in module via the calling of a stored address obtained during the retrieval of data from the module memory; and
retrieving data from and transmitting same to a data sink for use by an end user.

5. The method of claim 4 wherein the base unit is a RFID reader and the data retrieved is obtained from RFID tags.

6. Data retrieval apparatus comprising:
a base module comprising a microcontroller and base module programmable memory, said microcontroller operating in accordance with code in said base module programmable memory;
at least one plug-in module operationally interconnected to said base module, said at least one plug-in module including a memory portion addressable by said microcontroller, said memory portion having at least one of (a) an initialization routine and (b) functional routines;

said microcontroller, during an initialization routine initiated upon accessing the initialization routine of a given module, stores the address of functional routines contained in the memory portion of said given module; and
means within said base module to access said at least one of items a and b.

7. The apparatus as claimed in claim 6 wherein:
said data retrieval apparatus comprises a Radio Frequency Identification (RFID) reader; and
said microcontroller utilizes a user program associated with a given module.

8. Data reader apparatus comprising:
a base module comprising a microcontroller, base module programmable memory and connectors adapted to operationally interconnect with plug-in modules, said microcontroller operating in accordance with code in said base module programmable memory; and
at least one plug-in RF generator module and at least one plug-in communication module attached to and operationally interconnected with said base module, said modules each including a memory portion addressable by said microcontroller during an initialization routine, said memory portion comprising one or more routines usable by said plug-in module upon command by said microcontroller in performing data retrieval and transmission operations, at least one of said routines in each of said plug-in modules being accessible by said base module for performing a specialized function of that plug-in module upon command by said base module.

\* \* \* \* \*